US010029665B2

(12) United States Patent
Okano et al.

(10) Patent No.: US 10,029,665 B2
(45) Date of Patent: Jul. 24, 2018

(54) BRAKE DEVICE

(71) Applicants: ADVICS CO., LTD., Kariya-shi, Aichi-pref. (JP); TOYOTA JIDOSHA KABUSHIKI KAISHA, Toyota-shi, Aichi-ken (JP)

(72) Inventors: Takahiro Okano, Chiryu (JP); Masaki Ninoyu, Obu (JP); Kiyohito Takeuchi, Nagoya (JP); Masaaki Komazawa, Miyoshi (JP); Yusuke Kamiya, Okazaki (JP)

(73) Assignees: ADVICS CO., LTD., Kariya, Aichi Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 57 days.

(21) Appl. No.: 15/112,945

(22) PCT Filed: Jan. 8, 2015

(86) PCT No.: PCT/JP2015/050411
§ 371 (c)(1),
(2) Date: Jul. 20, 2016

(87) PCT Pub. No.: WO2015/111440
PCT Pub. Date: Jul. 30, 2015

(65) Prior Publication Data
US 2016/0339889 A1 Nov. 24, 2016

(30) Foreign Application Priority Data
Jan. 24, 2014 (JP) ................................ 2014-011814

(51) Int. Cl.
*B60T 13/66* (2006.01)
*B60T 7/04* (2006.01)
(Continued)

(52) U.S. Cl.
CPC ............ *B60T 13/662* (2013.01); *B60T 7/042* (2013.01); *B60T 13/146* (2013.01); *B60T 13/686* (2013.01)

(58) Field of Classification Search
CPC ........ B60T 13/662; B60T 13/66; B60T 7/042; B60T 13/143; B60T 13/686; B60T 7/12
See application file for complete search history.

(56) References Cited

U.S. PATENT DOCUMENTS

2009/0096280 A1 4/2009 Yamanao et al.
2011/0285198 A1 11/2011 Nakata et al.
(Continued)

FOREIGN PATENT DOCUMENTS

JP 05310108 A * 11/1993
JP 05310109 A * 11/1993
(Continued)

OTHER PUBLICATIONS

International Search Report (PCT/ISA/210) dated Apr. 14, 2015, by the Japanese Patent Office as the International Searching Authority for International Application No. PCT/JP2015/050411.
(Continued)

*Primary Examiner* — Melanie Torres Williams
(74) *Attorney, Agent, or Firm* — Buchanan Ingersoll & Rooney PC

(57) ABSTRACT

A brake device for controlling an actual pressure of an output hydraulic pressure outputted from a pressure adjusting device and applying a braking force to a wheel of a vehicle based on the actual pressure of the output hydraulic pressure. The brake device includes an actual pressure judging portion configured to judge whether or not the actual pressure of the output hydraulic pressure is the pressure that is within the range of the dead zone and a adjusting portion configured to execute a target pressure adjustment for adjusting a target pressure of the output hydraulic pressure to approximate a side of the actual pressure of the output hydraulic pressure.

13 Claims, 6 Drawing Sheets

(51) Int. Cl.
*B60T 13/14*     (2006.01)
*B60T 13/68*     (2006.01)

(56) References Cited

U.S. PATENT DOCUMENTS

2011/0285199 A1    11/2011  Ishida
2014/0327296 A1    11/2014  Ishida
2015/0015061 A1     1/2015  Masuda et al.

FOREIGN PATENT DOCUMENTS

JP       06312654 A  * 11/1994
JP     2009-040376 A    2/2009
JP     2009-090946 A    4/2009
JP     2011-240873 A   12/2011
JP     2013-111998 A    6/2013
JP     2013-193619 A    9/2013

OTHER PUBLICATIONS

Written Opinion (PCT/ISA/237) dated Apr. 14, 2015, by the Japanese Patent Office as the International Searching Authority for International Application No. PCT/JP2015/050411.

* cited by examiner

CYLINDER OPENING SIDE ⟵⟶ CYLINDER BOTTOM SURFACE SIDE

NO TARGET PRESSURE AJUSTMENT

WITH TARGET PRESSURE AJUSTMENT

_BRAKE DEVICE_

TECHNICAL FIELD

This invention relates to a brake device which is used for a vehicle.

BACKGROUND ART

Conventionally, a brake device is known which is equipped with a master cylinder and a mechanical type servo pressure generating portion, etc., as disclosed, for example, in a Japanese Patent Publication 2011-240873 A. Further, a brake device which is equipped with a mechanical regulator for generating a hydraulic pressure in a servo chamber corresponding to a pilot pressure based on an accumulator pressure in an accumulator is disclosed in another Japanese Patent Publication 2013-193619 A. There is also disclosed a device which controls the wheel cylinder pressure by an opening and closing of the electromagnetic valves without using a regulator. According to these conventional brake devices, a target pressure for a brake operating amount is preset with respect to the servo chamber or the wheel cylinder and an actual pressure (actual pressure in the servo chamber or the wheel cylinder) is controlled to be the target pressure (target pressure in the servo chamber or the wheel cylinder).

According to these conventional brake devices, for example, as disclosed in a Japanese Patent Publication 2009-40376 A, a predetermined dead zone is preset for the target pressure. A brake device recognizes that the pressure has reached substantially to the target pressure when the actual pressure enters into the dead zone (dead zone range) upon hydraulic pressure control. By setting such dead zone, hunting of the hydraulic pressure control can be more suppressed than in a case of setting the target pressure to one point.

CITATION LIST

Patent Literature

Patent Literature 1: JP2011-240873 A
Patent Literature 2: JP2013-193619 A
Patent Literature 3: JP2009-40376 A

SUMMARY OF INVENTION

Technical Problem(s)

However, it happens that a deviation of an actual pressure from the target pressure is generated during a braking operation by the dead zone according to the conventional brake devices explained above. In a brake device in which the actual pressure is controlled to be within the dead zone range when the actual pressure is out of the dead zone range set for the target pressure, a controllability of braking force may drop derived from the setting of such dead zone. In other words, a deviation of controlling responsiveness may arise due to a pressure difference between the actual pressure within the dead zone range and the target pressure.

Accordingly, this invention was made in consideration with the above-mentioned situation and the objective of the invention is to provide a brake device which can suppress occurrence of the deviation of the controlling responsiveness of the braking force due to the setting of the dead zone.

Solution to Problem(s)

The brake device according to a first aspect of the invention is characterized in that the brake device controls an actual pressure of an output hydraulic pressure outputted from a pressure adjusting device and applies a braking force to a wheel of a vehicle based on the actual pressure of the output hydraulic pressure. The brake device controls the pressure adjusting device so that the actual pressure of the output hydraulic pressure becomes a pressure which is within a range of a dead zone that is set for a target pressure of the output hydraulic pressure when the actual pressure of the output hydraulic pressure is a hydraulic pressure which is out of the range of the dead zone and includes an actual pressure judging portion configured to judge whether the actual pressure of the output hydraulic pressure is the hydraulic pressure which is within the range of the dead zone or not and an adjusting portion configured to execute a target pressure adjustment for adjusting the target pressure of the output hydraulic pressure to come close to a side of the actual pressure of the output hydraulic pressure.

According to the conventional brake devices, the regulator is not controlled until the actual pressure of the output hydraulic pressure (hereinafter referred to as simply "actual pressure") becomes a pressure which is out of the range of the dead zone set for a target pressure of the output hydraulic pressure (hereinafter referred to as simply "target pressure") even the target pressure changes because of the function of the dead zone. This may cause a delay of actual pressure change relative to the target pressure change. For example, this delay occurs larger as the actual pressure is at a higher pressure side in the dead zone range when the output hydraulic pressure is increased from a constant state and larger as the actual pressure is positioned at a lower pressure side in the dead zone range when the output hydraulic pressure is decreased from the constant state. Oppositely, there is a case that such delay is relatively small. For example, the delay occurs smaller as the actual pressure is positioned at a lower pressure side in the dead zone range when the output hydraulic pressure is increased from the constant state and smaller as the actual pressure is positioned at a higher pressure side in the dead zone range when the output hydraulic pressure is decreased from the constant state. In summary, the control responsiveness is deviated due to the dead zone.

However, according to the first aspect of the invention, the target pressure per se is adjusted to be closer to an actual pressure when the actual pressure is within the range of the dead zone. This may minimize the difference between the actual pressure within the range of the dead zone and the target pressure, and the deviation of delay can be suppressed. In other words, the deviation of control responsiveness of braking force due to the dead zone can be suppressed.

The brake device according to a second aspect of the invention is characterized in that the brake device further includes an actual pressure change mode judging portion configured to judge whether the actual pressure of the output hydraulic pressure is constant or not, wherein the adjusting portion executes a target pressure adjustment when the actual pressure of the output hydraulic pressure is judged to be within the range of the dead zone by the actual pressure judging portion and at the same time when the actual pressure of the output hydraulic pressure is judged to be constant by the actual pressure change mode judging portion.

According to the structure of the second aspect, the adjusting portion executes the target pressure adjustment when the actual pressure is stable. There is a possibility of actual pressure variation due to a hysteresis immediately after the stopping of the control of the regulator. However, according to the structure of the second aspect of the invention, the execution of target pressure adjustment can be prevented during the actual pressure variation period. Accordingly, a large variation (adjustment) of the target pressure due to the following of the target pressure to the actual pressure can be prevented.

The brake device according to a third aspect of the invention is characterized in that in the feature of the first or the second aspect, the brake device further includes a target pressure change mode judging portion configured to judge whether the target pressure of the output hydraulic pressure is constant or not, wherein the adjusting portion executes the target pressure adjustment when the actual pressure of the output hydraulic pressure is judged to be within the range of the dead zone by the actual pressure judging portion and at the same time when the target pressure of the output hydraulic pressure is judged to be constant by the target pressure change mode judging portion.

According to the structure of the third aspect of the invention, the adjusting portion executes a target pressure adjustment under the stable control state of the regulator. In other words, similar to the second aspect, a large variation of the target pressure can be prevented.

The brake device according to a fourth aspect of the invention is characterized in that in any one of the features of the first through third aspects, the brake device further includes a target pressure change amount judging portion configured to judge whether or not a change amount per unit time of the target pressure of the output hydraulic pressure is equal to or less than a predetermined threshold change amount, wherein the adjusting portion executes the target pressure adjustment when the actual pressure of the output hydraulic pressure is judged to be within the range of the dead zone by the actual pressure judging portion and at the same time when the change amount of the target pressure of the output hydraulic pressure is judged to be equal to or less than the predetermined threshold change amount by the target pressure change amount judging portion.

According to this structure of the fourth aspect of the invention, unnecessary adjustment for a steep change of the target pressure is not executed and a sure target pressure adjustment can be executed for a gradual change of the target pressure. It is noted that when the target pressure is gradually changed, the actual pressure is changed mostly stepwise. Therefore, the time when the actual pressure is out of the range of the dead zone becomes important by such stepwise change amount. However, according to the fourth aspect of the invention, the adjusting portion can execute the target pressure adjustment upon a gradual change of the target pressure where the actual pressure changes stepwise. Thus the deviation of the control responsiveness can be suppressed.

The brake device according to a fifth aspect of the invention is characterized in that in the feature of any one of the features of the first through fourth aspects, the adjusting portion is configured to set an upper limit adjusting amount per one time by the execution of the target pressure adjustment depending on the width of the dead zone. According to this structure, the adjusting portion can change the adjustment amount to an appropriate amount when the width of the dead zone is changed according to a map, or when the width of the dead zone is defined differently depending on the type of the vehicle.

The brake control device according to a sixth aspect of the invention is characterized in that in any one of the features of the first through fifth aspects, the brake device further includes an adjustment execution number of times judging portion configured to judge whether or not an execution number of times of the target pressure adjustment from the time when the actual pressure of the output hydraulic pressure becomes the hydraulic pressure within the range of the dead zone until a current time is less than a predetermined threshold execution number of times, wherein the adjusting portion executes the target pressure adjustment when the actual pressure of the output hydraulic pressure is judged to be within the range of the dead zone by the actual pressure judging portion and at the same time when the execution number of times of the target pressure adjustment is judged to be less than the predetermined threshold execution number of times by the adjustment execution number of times judging portion.

According to the structure of the sixth aspect of the invention, the maximum number of times of the target pressure adjustment that can be executed during the one time actual pressure holding operation of the regulator (during the time that the actual pressure exists within the dead zone) corresponds to the threshold number of times of the execution. Therefore, while the regulator device holds the actual pressure, even when an actual pressure variation occurs due to a pressure leakage or the like, except for a hysteresis, the target pressure adjustment would not be executed more than the threshold number of times of the execution to suppress continuing of changing of the target pressure by the target pressure adjustment following to the change of the actual pressure.

The brake device according to a seventh aspect of the invention is characterized in that in any one of the features of the first through sixth aspects, the brake device further includes an adjustment total amount judging portion configured to judge whether or not a total amount of the adjustment amount of the target pressure adjustment from the time when the braking force application to the wheel starts until the current time is equal to or less than a predetermined threshold adjustment total amount that increases the target pressure of the output hydraulic pressure, or is equal to or less than the predetermined threshold adjustment total amount that decreases the target pressure of the output hydraulic pressure, wherein the adjusting portion executes the target pressure adjustment when the actual pressure of the output hydraulic pressure is judged to be within the range of the dead zone by the actual pressure judging portion and at the same time when the total amount of the adjustment amount is judged to be equal to or less than the threshold adjustment total amount by the adjustment total amount judging portion.

According to the structure of the seventh aspect of the invention, the adjustment total amount during the one braking operation period from the start of the application of braking force to the end of the application thereof is restricted. Accordingly, in a system which requires the resetting of the adjustment amount to zero by the time the one braking operation ends (end of entire control), the target pressure adjustment can be executed in a range that the adjustment amount is reset to zero by the end of operation.

The brake device according to an eighth aspect of the invention is characterized in that in the feature of the seventh aspect, the adjustment total amount judging portion is configured to change the threshold adjustment total amount in response to the actual pressured of the output hydraulic pressure or a deceleration of the vehicle. According to this structure, since there are many opportunities to reset the adjustment when the value of the actual pressure is far from the value zero, the threshold adjustment total amount can be set large. On the other hand, when the value of the actual pressure is close to the value zero, the threshold adjustment total amount can be set small. Thus, the unnecessary raising of the adjustment amount with respect to the low actual pressure can be suppressed. Further, according to this structure, the deviation of the braking responsiveness can be suppressed, keeping the good braking operation feeling.

The brake device according to a ninth aspect of the invention is characterized in that in the feature of any one of the first through eighth aspects, the brake device further includes an increase adjustment judging portion configured to judge whether or not the total amount of the adjustment amount by the target pressure adjustment from the time when the braking force application to the wheel starts until the current time is the total amount that increases the target pressure of the output hydraulic pressure and a target pressure decrease judging portion configured to judge whether or not the target pressure of the output hydraulic pressure is decreasing, wherein the adjusting portion adjusts the target pressure so that the total amount of the adjustment amount by the target pressure adjustment decreases when the total amount of the adjustment amount is judged to be the amount that increases the target pressure of the output hydraulic pressure by the increase adjustment judging portion and at the same time when the target pressure of the output hydraulic pressure is judged to be decreasing by the target pressure decrease judging portion. There are two types of the target pressure adjustment, one being for increasing the target pressure and the other being for decreasing the target pressure and there are various total amounts of the adjustment amount of the target pressure adjustment. As the attribute values, one total amount of the adjustment amount is the amount for increasing the target pressure and another total amount is the amount for decreasing the target pressure and further there is the total amount being zero.

According to the structure of the ninth aspect of the invention, the total amount of the adjustment amount can be effectively minimized to be zero by the end of the braking operation by decreasing the total amount (adjustment to the decreasing side) when the target pressure is decreasing under the state that the total amount of the adjustment amount is the total amount that increases the target pressure, i.e., under the state that the target pressure is shifted to the increasing side more than the normal circumstance thereof by the total amount.

The brake device according to a tenth aspect of the invention is characterized in that in the feature of any one of the first through ninth aspects, the brake device further includes a decrease adjustment judging portion configured to judge whether or not the total amount of the adjustment amount by the target pressure adjustment from the time when the braking force application to the wheel starts until the current time is the total amount that decreases the target pressure of the output hydraulic pressure and a target pressure increase judging portion configured to judge whether or not the target pressure of the output hydraulic pressure is increasing, wherein the adjusting portion adjusts the target pressure so that the total amount of the adjustment amount by the target pressure adjustment decreases when the total amount of the adjustment amount is judged to be the amount that decreases the target pressure of the output hydraulic pressure by the decrease adjustment judging portion and at the same time when the target pressure of the output hydraulic pressure is judged to be increasing by the target pressure increase judging portion.

According to the structure of the tenth aspect of the invention, the total amount of the adjustment amount can be effectively minimized to be zero by the end of the braking operation by decreasing the total amount (adjustment to the increasing side) when the target pressure is increasing under the state that the total amount of the adjustment amount is the total amount that decreases the target pressure, i.e., under the state that the target pressure is shifted to the decreasing side more than the normal circumstance thereof by the total amount.

The brake device according to an eleventh aspect of the invention is characterized in that in the feature of the tenth aspect, the brake device further includes a target pressure decrease judging portion configured to judge whether or not the target pressure of the output hydraulic pressure is decreasing, the adjusting portion adjusts the target pressure so that the total amount of the adjustment amount by the target pressure adjustment decreases and at the same time a decrease amount per unit time thereof becomes smaller than a case that the target pressure of the output hydraulic pressure is judged to be increasing by the target pressure increase judging portion, when the total amount of the adjustment amount is judged to be the amount that decreases the target pressure of the output hydraulic pressure by the adjustment decrease judging portion and at the same time when the target pressure of the output hydraulic pressure is judged to be decreasing by the target pressure decrease judging portion.

According to the structure of the eleventh aspect of the invention, the total amount of the adjustment amount can be decreased (adjustment to the increasing side) when the target pressure is decreasing under the state that the total amount of the adjustment amount is the amount that decreases the target pressure, i.e., under the state that the target pressure is shifted to the decreasing side more than the normal circumstance thereof by the total amount. It may possibly occur in a braking operation that the pressure increase is not expected from the state that there exists the total amount of the adjustment amount which decreases the target pressure. However, according to the structure of this aspect of the invention, the total amount of the adjustment amount can be effectively minimized to be zero by the end of the braking operation. It is further noted that according to the structure of the invention, the target pressure is adjusted to the pressure increasing side even when the target pressure is decreasing. Even under such state, the adjustment is made gradually compared to the adjustment to the pressure increasing side when the target pressure is increasing. This can minimize the different or uncomfortable feeling of the braking operation given to an operator of the vehicle.

The brake device according to a twelfth aspect of the invention is characterized in that in the feature of any one of the ninth through eleventh aspects, when the adjusting portion executes the target pressure adjustment so that the total amount of the adjustment amount by the target pressure adjustment decreases, the adjusting portion sets an execution period and prohibits the target pressure adjustment that increases the total amount of the adjustment amount in the execution period. According to this structure, the total amount of the adjustment amount can be more surely minimized to be zero due to the prohibiting of the target pressure adjustment that increases the total amount in the execution period.

The brake device according to a thirteenth aspect of the invention is characterized in that in the feature of any one of the ninth through twelfth aspects, the brake device further includes a specific change detecting portion configured to detect as a specific change of the target pressure at least one of a change of the target pressure of the output hydraulic pressure from increasing to decreasing, a change of the target pressure of the output hydraulic pressure becoming constant after increasing and thereafter changing to decreasing, a change of the target pressure of the output hydraulic pressure from decreasing to increasing and a change of the target pressure of the output hydraulic pressure becoming constant after decreasing and thereafter changing to increasing, wherein the adjusting portion executes the target pressure adjustment so that the total amount of the adjustment amount by the target pressure adjustment decreases, when the specific change of the output hydraulic pressure is detected by the specific change detecting portion.

According to the above structure of the thirteenth aspect of the invention, since the adjusting portion executes the adjustment that decreases the total amount when the target pressure makes a specific change, the mixture of "target pressure adjustment" and the "total amount decreasing adjustment" can be prevented in the cases other than the specific change of the target pressure and accordingly, only the target pressure adjustment can be executed effectively.

BRIEF EXPLANATION OF ATTACHED DRAWINGS

EMBODIMENTS FOR IMPLEMENTING INVENTION

Figure 1:
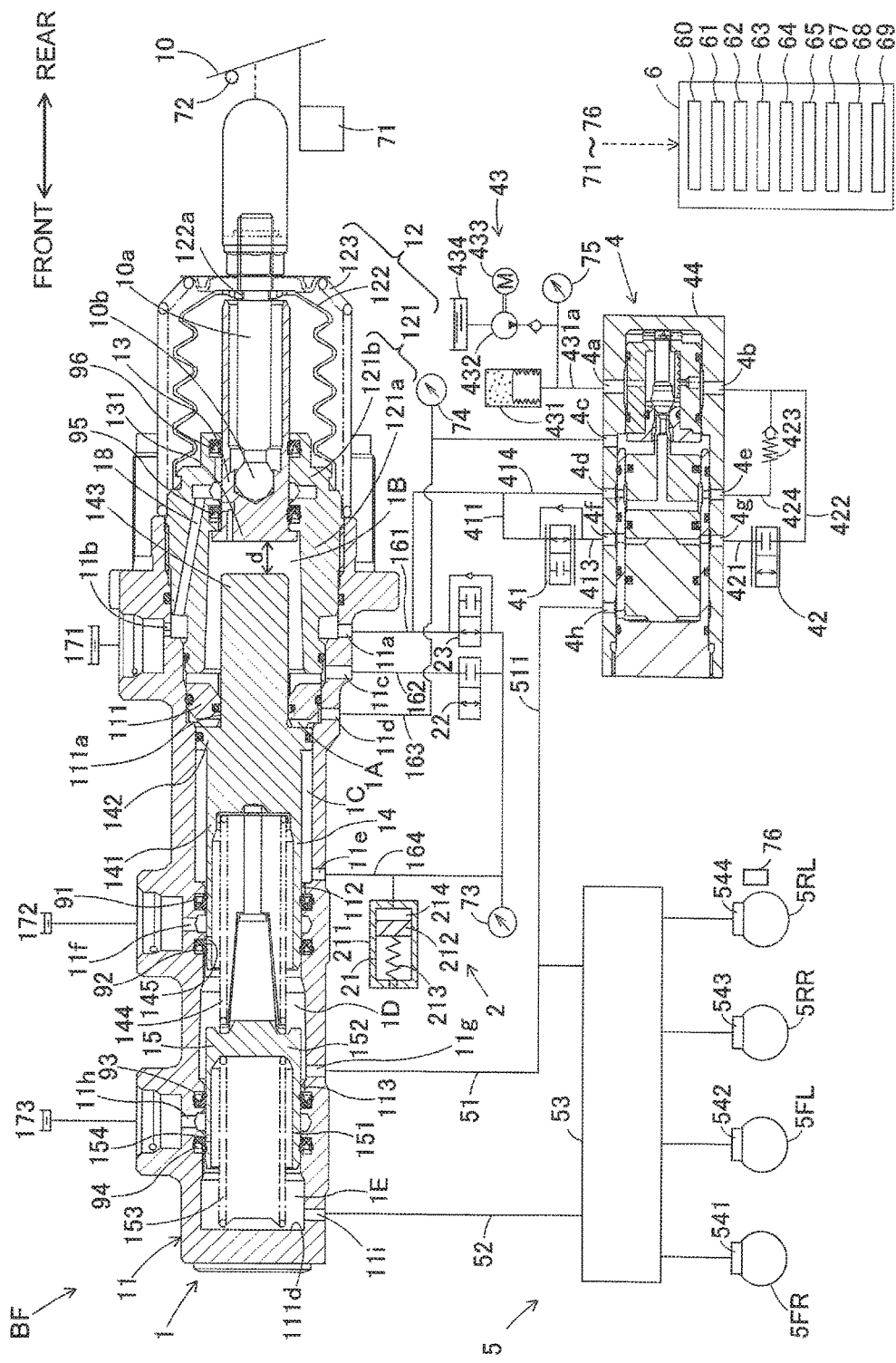
FIG. 1 is a conceptual view of the brake device according to a first embodiment of the invention.

The brake device according to the embodiments of the invention will be explained hereinafter with reference to the attached drawings. It is noted that the same or equivalent components or parts are referenced with the same symbols or the numerals and the shape and the size of each component in the drawings, by which the structural explanation thereof will be made, are not necessarily accurate to the actual product.

First Embodiment

As shown in FIG. 1, the brake device is formed by a hydraulic pressure braking force generating device BF which generates the hydraulic pressure braking force and applies the hydraulic pressure braking force to the vehicle wheels 5FR, 5FL, 5RR and 5RL and a brake ECU 6 which controls the hydraulic pressure braking force generating device BF.

(Hydraulic Pressure Braking Force Generating Device BF)

The hydraulic pressure braking force generating device BF is formed by a master cylinder 1, a reaction force generating device 2, a first control valve 22, a second control valve 23, a servo pressure generating device 4, a hydraulic pressure control portion 5 and various sensors 71 through 76 and so on.

(Master Cylinder 1)

The master cylinder 1 is a portion which supplies the hydraulic pressure control portion 5 with the operating fluid in response to the operating amount of a brake pedal 10 and is formed by a main cylinder 11, a cover cylinder 12, an input piston 13, a first master piston 14 and a second master piston 15 and so on. The brake pedal 10 may be of any type of brake operating means that can perform braking operation by a driver of the vehicle.

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof. The main cylinder 11 is provided therein at portions closer to the front end than the inner wall portion 111 with a small diameter portion 112 (rear) and a small diameter portion 113 (front), each of which inner diameter is set to be slightly smaller than the inner diameter of the inner wall portion 111. In other words, the small diameter portions 112, 113 project from the inner circumferential surface of the main cylinder 11 having an inwardly annularly shaped profile. The first master piston 14 is provided inside the main cylinder 11 and is slidably movable along the small diameter portion 112 in the axial direction. Similarly, the second master piston 15 is provided inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end of the main cylinder 11 and is coaxially fitted into the rear side opening of the main cylinder 11. An inner diameter of a front portion 121a of the cylindrical portion 121 is formed to be greater than an inner diameter of the through hole 111a of the inner wall portion 111. Further, the inner diameter of the rear portion 121b is formed to be smaller than an inner diameter of the front portion 121a.

The boots 122 is of tubular bellow shaped and is used for dust prevention purpose and is extendible or compressible in front and rearward directions. The front side of the boots 122 is assembled to be in contact with the rear end opening of the cylindrical portion 121. A through hole 122a is formed at a central portion of the rear of the boots 122. The compression spring 123 is a coiled type biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical portion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. The operating rod 10a moves in response to the depression operation of the brake pedal 10. More specifically, when the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably and fluid-tightly in contact with the through hole 111a of the inner wall portion 111. The rear end of the projection portion 143 projects into the inner space of the cylindrical portion 121 passing through the through hole 111a and is separated from the inner peripheral surface of the cylindrical portion 121. The rear end surface of the projection portion 143 is separated from the bottom wall 131 of the input piston 13 and the separation distance "d" is formed to be variable.

It is noted here that a "first master chamber 1D" is defined by the inner peripheral surface of the main cylinder 11, a front side of the pressurizing cylindrical portion 141 of the first master piston 14 and a rear side of the second master piston 15. A rear chamber which is located further rearward of the first master chamber 1D, is defined by the inner peripheral surface (inner peripheral portion) of the main cylinder 11, the small diameter portion 112, a front surface of the flange portion 142 and the outer peripheral surface of the first master piston 14. The flange portion 142 of the first master piston 14 separates the rear chamber into a front portion and a rear portion and the front portion is defined to be a "second hydraulic pressure chamber 1C" and the rear portion is defined to be a "servo chamber 1A". A "first hydraulic pressure chamber 1B" is defined by the inner peripheral surface of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 13.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. A "second master chamber 1E" is defined by the inner peripheral surface and the inner bottom surface 111d of the main cylinder 11 and the second master piston 15.

Ports 11a to 11i, which connect the inside and the outside of the master cylinder 1, are formed at the master cylinder 1. The port 11a is formed at the main cylinder 11 at a location rearward of the inner wall portion 111. The port 11b is formed at the main cylinder 11 opposite to the port 11a at approximately the same location in the axial direction. The port 11a and the port 11b are in communication through an annular clearance formed between the inner circumferential surface of the main cylinder 11 and the outer circumferential surface of the cylindrical portion 121. The port 11a and the port 11b are connected to a conduit 161 and also connected to a reservoir 171.

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward of the port 11c and the port 11d connects the servo chamber 1A with a conduit 163. The port 11e is formed at a location forward of the port 11d and connects the second hydraulic pressure chamber 1C with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward. The port 11g is formed at a location forward of the port 11f and connects the first master chamber 1D with a conduit 51.

The port 11h is formed between the sealing members 93 and 94 provided at the small diameter portion 113 and connects a reservoir 173 with the inside of the main cylinder 11. The port 11h is in communication with the second master chamber 1E via a passage 154 formed at the pressurizing cylindrical portion 151 of the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

A sealing member, such as an O-ring and the like (see black dot in the drawings) is appropriately provided within the master cylinder 1. The sealing members 91 and 92 are provided at the small diameter portion 112 and in liquid-tightly contact with the outer circumferential surface of the first master piston 14. Similarly, the sealing members 93, 94 are provided at the small diameter portion 113 and in liquid-tightly contact with the outer circumferential surface of the second master piston 15. Additionally, sealing members 95 and 96 are provided between the input piston 13 and the cylindrical portion 121.

The stroke sensor 71 is a sensor which detects the operating amount (stroke amount) of the operation of the brake pedal 10 by a driver of the vehicle and transmits the detected result to the brake ECU 6. A brake stop switch 72 is a switch which detects whether the brake pedal 10 is depressed or not, using a binary signal and a detected signal is sent to the brake ECU 6.

(Reaction Force Generating Device 2)

The reaction force generating device 2 is a device which generates a reaction force against the operation force when the brake pedal 10 is depressed and is formed by mainly a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein and a reaction force hydraulic pressure chamber 214 is formed at a location forward side of the piston 212. The piston 212 is biased in the forward side direction by a compression spring 213. The reaction force hydraulic pressure chamber 214 is connected to the second hydraulic pressure chamber 1C via a conduit 164 and the port 11e, and is connected further to the first control valve 22 and the second control valve 23 via the conduit 164.

(First Control Valve 22)

The first control valve 22 is an electromagnetic valve which is structured to close under non-energized state and opening and closing thereof is controlled by the brake ECU 6. The first control valve 22 is disposed between the conduit 164 and the conduit 162 for communication therebetween. The conduit 164 is connected to the second hydraulic pressure chamber 1C via the port 11e and the conduit 162 is connected to the first hydraulic pressure chamber 1B via the port 11c. The first hydraulic pressure chamber 1B becomes in open state when the first control valve 22 opens and becomes in closed state when the first control valve 22 closes. Accordingly, the conduits 164 and 162 are formed for establishing fluid communication between the first hydraulic pressure chamber 1B and the second hydraulic pressure chamber 1C.

The first control valve 22 is closed under non-energized state and under this state communication between the first hydraulic pressure chamber 1B and the second hydraulic pressure chamber 1C is interrupted. Due to the closure of the first hydraulic pressure chamber 1B, the operating fluid is nowhere to flow and the input piston 13 and the first master piston 14 are moved integrally keeping the separation distance "d" therebetween to be constant. The first control valve 22 is open under the energized state and under such state, the communication between the first hydraulic pressure chamber 1B and the second hydraulic pressure chamber 1C is established. Thus, the volume change in the first hydraulic pressure chamber 1B and the second hydraulic pressure chamber 1C due to the advancement and retreatment of the first master piston 14 can be absorbed by the transferring of the operating fluid.

The pressure sensor 73 is a sensor which detects the reaction force hydraulic pressure of the second hydraulic pressure chamber 1C and the first hydraulic pressure chamber 1B and is connected to the conduit 164. The pressure sensor 73 detects the pressure of the second hydraulic pressure chamber 1C while the first control valve 22 is in a closed state and also detects the pressure of the first hydraulic pressure chamber 1B while the first control valve 22 is in an open state. The pressure sensor 73 sends the detected signal to the brake ECU 6.

(Second Control Valve 23)

The second control valve 23 is an electromagnetic valve which is structured to open under a non-energized state and the opening and closing thereof is controlled by the brake ECU 6. The second control valve 23 is disposed between the conduit 164 and the conduit 161 for establishing communication therebetween. The conduit 164 is in communication with the second hydraulic pressure chamber 1C via the port 11e and the conduit 161 is in communication with the reservoir 171 via the port 11a. Accordingly, the second control valve 23 establishes communication between the second hydraulic pressure chamber 1C and the reservoir 171 under the non-energized state not to generate any reaction force hydraulic pressure but interrupts the communication therebetween to generate the reaction force hydraulic pressure under the energized state.

(Servo Pressure Generating Device 4)

The servo pressure generating device 4 is formed by a pressure decreasing valve 41, a pressure increasing valve 42, a pressure supplying portion 43 and a regulator 44 and so on. The pressure decreasing valve 41 is a valve structured to open under a non-energized state and the flow-rate thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir 171 via the conduits 411, 161 and ports 11a and 11b. It is noted here that the conduit 411 may not be connected to the reservoir 171, but may be connected to a reservoir 434, which will be explained later. The reservoir 171 and the reservoir 434 may be formed with the same structure.

The pressure increasing valve 42 is a valve structured to close under a non-energized state and the flow-rate thereof is controlled by the brake ECU 6. One end of the pressure increasing valve 42 is connected to the conduit 421 and the other end thereof is connected to the conduit 422.

The pressure supplying portion 43 is a portion for supplying the regulator 44 mainly with a highly pressurized operating fluid. The pressure supplying portion 43 includes an accumulator 431, a hydraulic pressure pump 432, a motor 433 and the reservoir 434 and so on.

The accumulator 431 is a tank in which a highly pressurized operating fluid is accumulated and is connected to the regulator 44 and the hydraulic pressure pump 432 via a conduit 431*a*. The hydraulic pressure pump 432 is driven by the motor 433 and supplies the operating fluid which is reserved in the reservoir 434 to the accumulator 431. The pressure sensor 75 provided in the conduit 431*a* detects the accumulator hydraulic pressure in the accumulator 431 and the detected signal is sent to the brake ECU 6. The accumulator hydraulic pressure correlates with the accumulated operating fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 supplies the operating fluid to the accumulator 431 in order to recover a pressure up to the value equal to or more than the predetermined value.

Figure 2:
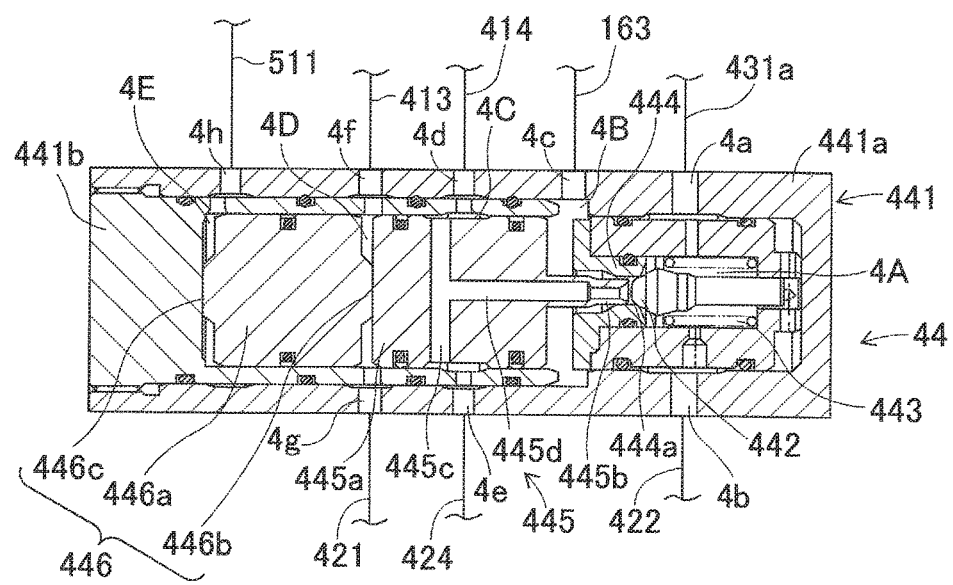
FIG. 2 is a cross sectional view of a regulator according to the first embodiment.

The regulator (corresponding to the pressure adjusting device) 44 includes a cylinder 441, a ball valve 442, a biasing portion 443, a valve seat portion 444, a control piston 445 and a sub-piston 446 and so forth as shown in FIG. 2.

The cylinder 441 includes a cylinder case 441*a* formed in a substantially bottomed cylinder-shape having a bottom surface at one end thereof (at the right side in the drawing) and a cover member 441*b* closing an opening of the cylinder case 441*a* (at the left side thereof in the drawing). It is noted here that the cylinder case 441*a* is provided with a plurality of ports 4*a* through 4*h* through which the inside and the outside of the cylinder case 441*a* are in communication. The cover member 441*b* is formed in a substantially bottomed cylinder-shape having a bottom surface and is provided with a cylindrical plurality of ports which is arranged opposite to the respective ports 4*a* through 4*h*.

The port 4*a* is connected to the conduit 431*a*. The port 4*b* is connected to the conduit 422. The port 4*c* is connected to a conduit 163. The conduit 163 connects the servo chamber 1A and the outlet port 4*c*. The port 4*d* is connected to the conduit 161 via the conduit 414. The port 4*e* is connected to the conduit 424 and further connected to the conduit 422 via a relief valve 423. The port 4*f* is connected to the conduit 413. The port 4*g* is connected to the conduit 421. The port 4*h* is connected to a conduit 511, which is branched from the conduit 51. It is noted here that the conduit 414 may not be connected to the conduit 161, but may be connected to the reservoir 434.

The ball valve 442 is a valve having a ball shape and is arranged at the bottom surface side (which will be hereinafter referred to also as a cylinder bottom surface side) of the cylinder case 441*a* inside of the cylinder 441. The biasing portion 443 is formed by a spring member biasing the ball valve 442 towards the opening side (which will be hereinafter referred to also as a cylinder opening side) of the cylinder case 441*a*, and is provided at the bottom surface of the cylinder case 441*a*. The valve seat portion 444 is a wall member provided at the inner peripheral surface of the cylinder case 441*a* and divides the cylinder into the cylinder opening side and the cylinder bottom surface side. A through passage 444*a* through which the divided cylinder opening side and the cylinder bottom surface side are in communication is formed at a center of the valve seat portion 444. The valve member 444 supports the ball valve 442 from the cylinder opening side in a manner that the biased ball valve 442 closes the through passage 444*a*. A valve seat surface 444*b* is formed at the opening of the cylinder bottom surface side of the through passage 444*a* and the ball valve 442 is detachably seated (in contact) on the valve seat surface 444*b*.

A space defined by the ball valve 442, the biasing portion 443, the valve seat portion 444 and the inner circumferential surface of the cylinder case 441*a* at the cylinder bottom surface side is referred to as a "first chamber 4A". The first chamber 4A is filled with the operating fluid and is connected to the conduit 431*a* via the port 4*a* and to the conduit 422 via the port 4*b*.

The control piston 445 includes a main body portion 445*a* formed in a substantially columnar shape and a projection portion 445*b* formed in a substantially columnar shape having a smaller diameter than the main body portion 445*a*. The main body portion 445*a* is arranged in the cylinder 441 in a coaxial and liquid-tight manner on the cylinder opening side of the valve seat portion 444, the main body portion 445*a* being slidably movable in the axial direction. The main body portion 445*a* is biased towards the cylinder opening side by means of a biasing member (not shown). A passage 445*c* is formed at a substantially intermediate portion of the main body portion 445*a* in a cylinder axis direction. The passage 445*c* extends in the radial direction (in an up-and-down direction as viewed in the drawing) and both end portions thereof open at a circumferential surface of the main body portion 445*a*. A portion of an inner circumferential surface of the cylinder 441 corresponding to an opening position of the passage 445*c* is provided with the port 4*d* and is formed to be recessed, which recessed space portion forms a "third chamber 4C".

The projection portion 445*b* projects towards the cylinder bottom surface side from a center portion of an end surface of the cylinder bottom surface side of the main body portion 445*a*. The projection portion 445*b* is formed so that the diameter thereof is smaller than the diameter of the through passage 444*a* of the valve seat portion 444. The projection portion 445*b* is coaxially provided relative to the through passage 444*a*. A tip end of the projection portion 445*b* is spaced apart from the ball valve 442 towards the cylinder opening side by a predetermined distance. A passage 445*d* is formed at the projection portion 445*b* so that the passage 445*d* extends in the cylinder axis direction and opens at a center portion of an end surface of the projection portion 445*b*. The passage 445*d* extends up to the inside of the main body portion 445*a* and is connected to the passage 445*c*.

A space defined by the end surface of the cylinder bottom surface side of the main body portion 445*a*, an outer surface of the projection portion 445*b*, the inner circumferential surface of the cylinder 441, the valve seat portion 444 and the ball valve 442 is referred to as a "second chamber 4B". The second chamber 4B is in communication with the ports 4*d* and 4*e* via the passages 445*d* and 445*c* and the third chamber 4C, under the state that the projection portion 445*b* is separated from the ball valve 442.

The sub-piston 446 includes a sub main body portion 446*a*, a first projection portion 446*b* and a second projection portion 446*c*. The sub main body portion 446*a* is formed in a substantially columnar shape. The sub main body portion 446a is arranged within the cylinder 441 in a coaxial and liquid-tight manner on the cylinder opening side of the main body portion 445a, the sub main body portion 446a being slidably movable in the axial direction.

The first projection portion 446b is formed in a substantially columnar shape having a smaller diameter than the sub main body portion 446a and projects from a center portion of an end surface of the cylinder bottom surface side of the sub main body portion 446a. The first projection portion 446b is in contact with the end surface of the cylinder bottom surface side of the sub main body portion 446a. The second projection portion 446c is formed in the same shape as the first projection portion 446b. The second projection portion 446c projects from a center portion of an end surface of the cylinder opening side of the sub main body portion 446a. The second projection portion 446c is in contact with the cover member 441b.

A space defined by the end surface of the cylinder bottom surface side of the sub main body portion 446a, an outer peripheral surface of the first projection portion 446b, an end surface of the cylinder opening side of the control piston 445 and the inner circumferential surface of the cylinder 441 is referred to as a "first pilot chamber 4D". The first pilot chamber 4D is in communication with the pressure decreasing valve 41 via the port 4f and the conduit 413 and is in communication with the pressure increasing valve 42 via the port 4g and the conduit 421.

A space defined by the end surface of cylinder opening side of the sub main body portion 446a, an outer peripheral surface of the second projection portion 446c, the cover member 441b and the inner circumferential surface of the cylinder 441 is referred to as a "second pilot chamber 4E". The second pilot chamber 4E is in communication with the port 11g via the port 4h and the conduits 511 and 51. Each of the chambers 4A through 4E is filled with the operating fluid. The pressure sensor 74 is a sensor that detects the servo pressure (corresponding to the "output hydraulic pressure") to be supplied to the servo chamber 1A and is connected to the conduit 163. The pressure sensor 74 sends the detected signal to the brake ECU 6.

As explained, the regulator 44 includes the control piston 445 which is driven by the difference between the force corresponding to the pressure in the first pilot chamber 4D (referred to also as "pilot pressure") and the force corresponding to the servo pressure (output hydraulic pressure) and the volume of the first pilot chamber 4D changes in response to the movement of the control piston 445 and the more the liquid flowing into or out of the first pilot chamber 4D increases, the more the amount of the movement of the control piston 445 from the reference point thereof increases under the equilibrium state that the force corresponding to the pilot pressure balances with the force corresponding to the servo pressure. Thus, the flowing amount of the liquid flowing into or out of the servo chamber 1A is structured to be increasing.

The regulator 44 is structured so that the more the flowing amount of the liquid flowing into the first pilot chamber 4D from the accumulator 431 increases, the larger the volume of the first pilot chamber 4D becomes and at the same time the more the flowing amount of the liquid flowing into the servo chamber 1A from the accumulator 431 increases and further, the more the flowing amount of the liquid flowing out from the first pilot chamber 4D into the reservoir 171 increases, the smaller the volume of the first pilot chamber 4D becomes and at the same time the more the flowing amount of the liquid flowing out of the servo chamber 1A into the reservoir 171 increases.

(Hydraulic Pressure Control Portion 5)

The first and the second master chambers 1D and 1E which generate the master cylinder hydraulic pressure (master pressure) are connected to the wheel cylinders 541 through 544 via the conduits 51 and 52 and ABS 53 (Anti-lock Brake System). The wheel cylinders 541 through 544 form a brake device for the vehicle wheels 5FR through 5RL. In more specifically, the port 11g of the first master chamber 1D and the port 11i of the second master chamber 1E are connected to the well-known ABS 53 via the conduits 51 and 52, respectively. The ABS 53 is connected to the wheel cylinders 541 through 544 which are operated to perform braking operation at the wheels 5FR through 5RL.

The ABS 53 includes a wheel speed sensor 76 which is equipped at each vehicle wheel to detect the wheel speed at the corresponding wheel. The detected signal which indicates the wheel speed detected by the wheel speed sensor 76 is outputted to the brake ECU 6.

In the ABS 53 structured above, the brake ECU 6 executes an ABS control (Anti-lock braking control) by controlling the switching over of each holding valve and the pressure decreasing valve based on the master pressure (presumed by the servo pressure detected by the pressure sensor 74), state of wheel speed and front/rear acceleration and adjusting the brake hydraulic pressure to be applied to each wheel cylinder 541 through 544, i.e., braking force to be applied to each wheel 5FR through 5RL by operating the motor when necessary. The ABS 53 is a device which supplies the operating fluid supplied from the master cylinder 1 to the wheel cylinders 541 through 544 by adjusting the amount and the timing based on the instructions from the brake ECU 6. The ABS 53 has a function of actuator which allows the operating fluid to flow into and discharge from the master chamber 1D.

Under the "linear mode" which will be explained later, when the hydraulic pressure sent from the accumulator 431 of the servo pressure generating device 4 is controlled by the pressure increasing valve 42 and the pressure decreasing valve 41, the servo pressure is generated in the servo chamber 1A. Then the first and the second master pistons 14 and 15 advance to pressurize the first and the second master chambers 1D and 1E. The hydraulic pressures in the first and the second master chambers 1D and 1E are supplied to the wheel cylinders 541 through 544 via the conduits 51 and 52 and the ABS 53 as the master pressure thereby applying hydraulic pressure braking force to the wheels 5FR through 5RL.

(Brake ECU 6)

The brake ECU 6 is an electronic control unit and includes a microprocessor. The microprocessor includes an input/output interface, CPU, RAM, ROM and a memory portion such as non-volatile memory, connected with one another through bus communication.

The brake ECU 6 is connected to the various sensors 71 through 76 for controlling the electromagnetic valves 22, 23, 41 and 42 and the motor 433 and so on. The operating amount (stroke amount) of brake pedal 10 operated by the operator of the vehicle is inputted to the brake ECU 6 from the stroke sensor 71, whether or not the operation of the brake pedal 10 by the operator of the vehicle is performed is inputted to the brake ECU 6 from the brake stop switch 72, the reaction force hydraulic pressure of the second hydraulic pressure chamber 1C or the pressure (or the reaction force hydraulic pressure) of the first hydraulic pressure chamber 1B is inputted to the brake ECU 6 from the pressure sensor 73, the servo pressure supplied to the servo chamber 1A is inputted to the brake ECU 6 from the pressure sensor 74, the accumulator hydraulic pressure of the accumulator 431 is inputted to the brake ECU 6 from the pressure sensor 75 and each wheel speed of the respective vehicle wheels 5FR through 5RL is inputted to the brake ECU 6 from each of the wheel speed sensors 76. The brake ECU 6 memorizes two control modes, "linear mode" and "REG mode". The REG mode is a mode in which the regulator 44 is operated even the electric system is broken but the explanation thereof will be omitted.

(Linear Mode)

The linear mode of the brake ECU 6 will be explained hereinafter. The linear mode means a normally operated brake control. In other words, the brake ECU 6 energizes the first control valve 22 and opens the first control valve 22 and energizes the second control valve 23 and closes the second control valve 23. By this closing of the second control valve 23, the communication between the second hydraulic pressure chamber 1C and the reservoir 171 is interrupted and by the opening of the first control valve 22, the communication between the first and the second hydraulic pressure chambers 1B and 1C is established. Thus, the linear mode is a mode for controlling the servo pressure of the servo chamber 1A by controlling the pressure decreasing and pressure increasing valves 41 and 42 under the first control valve 22 being opened and the second control valve 23 being closed. The pressure decreasing valve 41 and the pressure increasing valve 42 may be said to be a valve device which adjusts the flowing amount of the operating fluid which flows into or out of the first pilot chamber 4D. Under this linear mode, the brake ECU 6 calculates the "required braking force" of the driver of the vehicle based on the operating amount of the brake pedal 10 detected by the stroke sensor 72 (displaced amount of the input piston 13) or the operating force of the brake pedal 10.

In more detail, under the state that the brake pedal 10 is not depressed, the linear mode becomes the state as explained above, i.e., the state that the ball valve 442 closes the through passage 444*a* of the valve seat portion 444. Under this state, the pressure decreasing valve 41 is in an open state and the pressure increasing valve 42 is in a closed state. In other words, the communication between the first chamber 4A and the second chamber 4B is interrupted.

The second chamber 4B is in communication with the servo chamber 1A via the conduit 163 to keep the hydraulic pressures in the two chambers 4B and 1A being mutually in an equal level. The second chamber 4B is in communication with the third chamber 4C via the passages 445*c* and 445*d* of the control piston 445 and is further in communication with the reservoir 171 via the conduits 414 and 161. One side of the pilot hydraulic pressure chamber 4D is closed by the pressure increasing valve 42, while the other side thereof is connected to the reservoir 171 and the second chamber 4B through the pressure decreasing valve 41, thereby keeping the pressure level of the two chambers 4D and 4B mutually to be equal to each other. The second pilot chamber 4E is in communication with the first master chamber 1D via the conduits 511 and 51 thereby keeping the pressure level of the two chambers 4E and 1D mutually to be equal to each other.

From this state, when the brake pedal 10 is depressed, the brake ECU 6 controls the pressure decreasing valve 41 and the pressure increasing valve 42 based on the target friction braking force. In other words, the brake ECU 6 controls the pressure decreasing valve 41 to be in a closing direction and controls the pressure increasing valve 42 to be in an open direction.

When the pressure increasing valve is opened, a communication between the accumulator 431 and the first pilot chamber 4D is established. When the pressure decreasing valve 41 is closed, a communication between the first pilot chamber 4D and the reservoir 171 is interrupted. The pressure in the first pilot chamber 4D can be raised by the highly pressurized operating fluid supplied from the accumulator 431. By this raising of the pressure in the first pilot chamber 4D, the control piston 445 slidably moves towards the cylinder bottom surface side. Then the tip end of the projecting portion 445 of the control piston 445 is brought into contact with the ball valve 442 to close the passage 445*d* by the ball valve 442. Thus the fluid communication between the second chamber 4B and the reservoir 171 is interrupted.

By further slidable movement of the control piston 445 towards the cylinder bottom surface side, the ball valve 442 is pushed towards the cylinder bottom surface side by the projection portion 445*b* to thereby separate the ball valve 442 from the valve seat surface 444*b*. This will allow establishment of fluid communication between the first chamber 4A and the second chamber 4B through the through passage 444*a* of the valve seat portion 444. As the highly pressurized operating fluid is supplied to the first chamber 4A from the accumulator 431, the hydraulic pressure in the second chamber 4B is also increased by the communication therebetween. It is noted that the more the separated distance of the ball valve 442 from the valve seat surface 444*b* becomes large, the more the fluid passage for the operating fluid becomes large and accordingly, the hydraulic pressure in the fluid passage downstream of the ball valve 442 becomes high. In other words, the more the pressure in the first pilot chamber 4D (pilot pressure), the larger the moving distance of the control piston 445 becomes and the larger the separated distance of the ball valve 442 from the valve seat surface 444*b* becomes and accordingly, the hydraulic pressure in the second chamber 4B (servo pressure) becomes high. The brake ECU 6 controls the pressure increasing valve 42 so that the fluid passage at the downstream side of the pressure increasing valve 42 becomes large and at the same time controls the pressure decreasing valve 41 so that the fluid passage at the downstream side of the pressure decreasing valve 41 is closed, in such a manner that the more the displacement amount of the input piston 13 (operating amount of the brake pedal 10) detected by the stroke sensor 72, the higher the pilot pressure in the first pilot chamber 4D becomes. In other words, the more the displacement amount of the input piston 13 (operating amount of the brake pedal 10), the higher the pilot pressure becomes and the higher the servo pressure becomes.

As the pressure increase of the second chamber 4B, the pressure in the servo chamber 1A which is in fluid communication with the second chamber 4B increases. By the pressure increase in the servo chamber 1A, the first master piston 14 advances forward and the pressure in the first master chamber 1D increases. Then the second master piston 15 advances forward also and the pressure in the second master chamber 1E increases. By the increase of the pressure in the first master chamber 1D, highly pressurized operating fluid is supplied to the ABS 53 which will be explained later and the second pilot chamber 4E. The pressure in the second pilot chamber 4E increases, but since the pressure in the first pilot chamber 4D is also increased, the sub piston 446 does not move. Thus, the highly pressurized (master pressure) operating fluid is supplied to the ABS 53 and friction brake is operated to brake the vehicle. The force advancing the first master piston 14 under the linear mode corresponds to the force corresponding to the servo pressure.

When the braking operation is released, as opposite to the above, the pressure decreasing valve 41 is open and the pressure increasing valve 42 is closed to establish the communication between the reservoir 171 and the first pilot chamber 4D. Then the control piston 445 retreats and the vehicle return to the state before depression of the brake pedal 10.

(Target Pressure Adjustment)

A target servo pressure (hereinafter referred also to "target pressure") to be outputted relative to the stroke amount of the brake pedal 10 is set in the brake ECU 6. The brake ECU 6 according to this embodiment memorizes a map in which the target pressure relative to the stroke amount is set. The brake ECU 6 controls the pressure decreasing valve 41 and the pressure increasing valve 42 so that the actual servo pressure (hereinafter referred to also as "actual pressure") to be measured by the pressure sensor 74 becomes the target pressure based on the stroke amount measured by the stroke sensor 71 and the target pressure corresponding to the stroke amount. Regarding to the map, two maps one at the pressure increasing and the other at the pressure decreasing may be memorized. It is noted that the actual pressure may be said to be the "actual pressure of the servo pressure" and the target pressure may be said to be "target pressure of the servo pressure".

A dead zone is set to the target pressure. The dead zone has the same width at positive side and negative side relative to the center of the target pressure. Under the linear mode, the brake ECU 6 executes hydraulic pressure control when the actual pressure enters into the dead zone range presuming that the actual pressure substantially has reached to the target pressure. As long as the actual pressure is within the dead zone range, the brake ECU 6 does not execute control to have the actual pressure follow the target pressure even the target pressure changes.

It is noted that the brake ECU 6 includes functionally an adjusting portion 60, an actual pressure judging portion 61, an actual pressure change mode judging portion 62, a target pressure change amount judging portion 63, an adjustment total amount judging portion 64, an adjustment execution number of timers judging portion 65, an adjustment judging portion 67, a target pressure decrease judging portion 68 and a target pressure increase judging portion 69. The adjusting portion 60 has a function of executing the target pressure adjustment and executes the target pressure adjustment, when the actual pressure basically positions within the range of dead zone. According to this embodiment, the adjusting portion 60 is set to execute the target pressure adjustment when the later explained predetermined conditions have been established under the actual pressure being within the range of the dead zone. The target pressure adjustment means that the target pressure is adjusted to the side where the target pressure becomes closer to the actual pressure. The conditions will be explained hereinafter.

The actual pressure judging portion 61 judges whether or not the actual pressure is a pressure within the dead zone range. The actual pressure change mode judging portion 62 judges whether or not the actual pressure is constant. The actual pressure change mode judging portion 62 judges whether or not the actual pressure is constant, based on the determination whether or not the actual pressure is constant for a set time period. The target pressure change amount judging portion 63 judges whether or not the change amount of the target pressure per unit time is equal to or less than a predetermined threshold change amount. The threshold change amount is set to be equal to or less than a maximum value of the change amount (inclination) of the target pressure where a stepped wave is generated in the change of the actual pressure.

The adjustment total amount judging portion 64 judges whether or not the total amount of the adjustment amount of the target pressure adjustment from the start of the application of the hydraulic pressure braking force to the wheels 5FR, 5FL, 5RR and 5RL to the current time is equal to or less than the predetermined threshold adjustment total amount. The total amount of the adjustment amount is an absolute value of the total adjustment amount which is the sum of the adjustment amount of one side of the increase/decrease of the target pressure by the target pressure adjustment being a plus side and the other side of the increase/decrease of the target pressure by the target pressure adjustment being a negative side. The adjustment total amount judging portion 64 resets the total amount of the adjustment amount when the application of the hydraulic pressure braking force to the wheels 5FR, 5FL, 5RR and 5RL ends. In other words, the total amount of the adjustment amount counting period defines one cycle as one braking operation (from the start of the braking operation to the end of the braking operation).

The adjustment execution number of times judging portion 65 judges whether or not the execution number of times of the target pressure adjustment from the start of the actual pressure holding control to the regulator 44 for holding the actual pressure (control to have the pressure decreasing valve 41 and the pressure increasing valve 42 to be in closed state) to the current time is less than the predetermined threshold execution number of times. The adjustment execution number of times judging portion 65 resets the execution number of times when the actual pressure holding control ends. In other words, the execution number of times counting period defines one cycle as one actual pressure holding control (from the start of actual pressure holding control to the end of the actual pressure holding control). The execution number of times is reset and is not counted during a control other than the actual pressure holding control and accordingly, the execution number of times surely becomes less than the threshold execution number of times.

The adjustment judging portion 67 judges whether or not the total amount of the adjustment amount is the value that increases the target pressure or whether or not the total amount of the adjustment amount is the value that decreases the target pressure. In other words, the adjustment judging portion 67 includes an adjustment increase judging portion configured to judge whether or not the total amount of the adjustment amount is the value that increases the target pressure and an adjustment decrease judging portion configured to judge whether or not the total amount of the adjustment amount is the value that decreases the target pressure. The target pressure decrease judging portion 68 judges whether or not the target pressure is decreasing (the inclination is at the decreasing side). The target pressure increase judging portion 69 judges whether or not the target pressure is increasing (the inclination is at the increasing side).

The predetermined conditions of the embodiment are that (a) the actual pressure change mode judging portion 62 has judged that the actual pressure is constant (b) the target pressure change amount judging portion 63 has judged that the change amount of the target pressure is equal to or less than the threshold change amount (c) the adjustment total amount judging portion 64 has judged that the total amount of the adjustment amount is equal to or less than the threshold adjustment total amount and that (d) the adjustment execution number of times judging portion 65 has judged that the number of execution of the target pressure adjustment is less than the threshold execution number of times.

Figure 8:
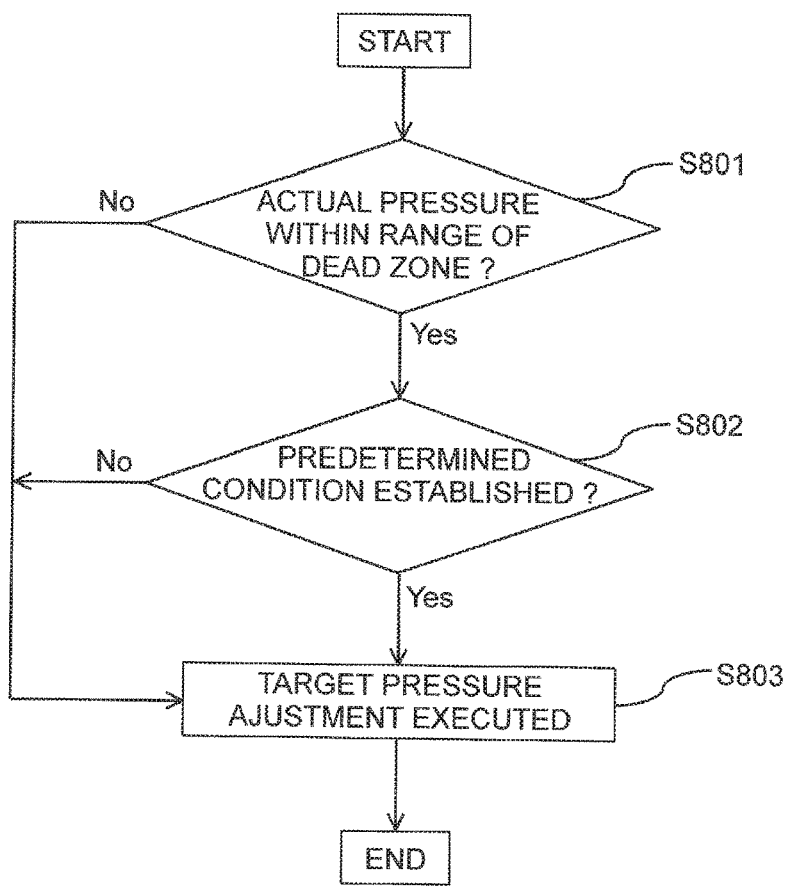
FIG. 8 is a flowchart showing a control flow regarding to the target pressure adjustment of the present embodiment.

The adjusting portion 60 executes the target pressure adjustment when the actual pressure is judged to be a hydraulic pressure within the dead zone range by the actual pressure judging portion 61 and at the same time the above predetermined conditions (a) through (d) are satisfied. As shown in FIG. 8, the adjusting portion 60 executes the target pressure adjustment (S 803) when the actual pressure is positioned within the dead zone (S 801: Yes) and the predetermined conditions are satisfied (S 802: Yes). It may be possible to change the order from "S 801 to S 802" to "S 802 to S 801". The adjusting portion 60 executes this control every predetermined time.

The target pressure adjustment will be explained by a concrete example. It is noted that the target pressure adjustment according to the embodiment is set to have the target pressure agree to the actual pressure. However, the target pressure adjustment is limited not to exceed the threshold adjustment total amount. If the threshold adjustment total amount cannot agree to the actual pressure due to the limitation of the threshold adjustment total amount, the target pressure adjustment is executed by the maximum amount within the limitation. For example, if the one side width of the dead zone (from the target pressure to one end of the dead zone) is 0.13 MPa and in such case, if the threshold adjustment total amount or the upper limit value of one time adjustment amount is 0.1 MPa, the adjustment amount of the target pressure adjustment when the actual pressure enters into the dead zone becomes 0.1 MPa. In such case, the target pressure approximates the actual pressure but does not agree therewith. The threshold execution number of times is set to one time and the threshold change amount is set to be 1 MPa/s.

Figure 3:
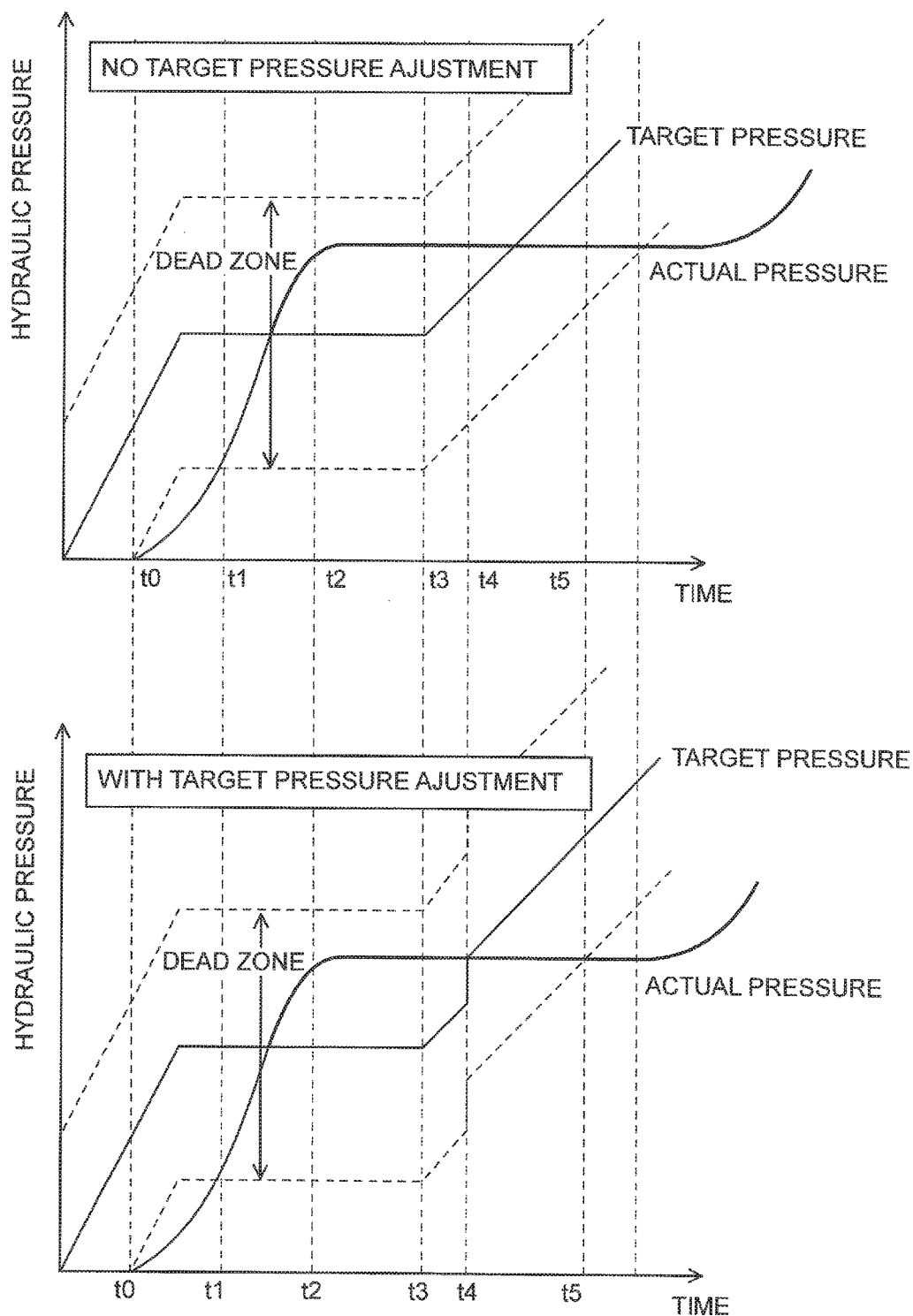
FIG. 3 is an explanatory view explaining a detail example of the target pressure adjustment according to the first embodiment.

The upper graph of FIG. 3 represents the case that the target pressure adjustment is not executed, while the lower graph represents the case that the target pressure adjustment has been executed. As shown in FIG. 3, the case when the braking operation is performed by the driver of the vehicle and the braking operation is held thereafter and the braking operation is additionally performed thereafter (brake pedal is increasingly depressed). At the time t0, the actual pressure is out of the dead zone range and pressure increasing control starts. At the time t1, the actual pressure enters into the dead zone range and the pressure increasing control is changed to the holding control. Between the time t1 and the time t2, the actual pressure increases by the hysteresis. The hysteresis is a phenomenon, for example, that the servo pressure changes by the movement of the control piston 445, even the first pilot chamber 4D becomes in a sealing state due to the shifting of control of the pressure decreasing valve 41 and the pressure increasing valve 42 to the actual pressure holding control.

At the time t2, the actual pressure becomes stable under the state that the actual pressure is exceeding the target pressure. At the time t3, by the additional depression of the brake pedal for additional braking operation, the target pressure begins to increase and at the time t4, the predetermined conditions of target pressure adjustment have been established. Regarding to the condition (a), the actual pressure change mode judging portion 62 judges that the actual pressure is constant during the time period between the time t3 and the time t4 to establish the condition (a). Regarding to the condition (b), the target pressure change amount judging portion 63 judges that the change amount of the target pressure is equal to or less than the threshold change amount to establish the condition (b). It is noted here that the change amount for the condition (b) does not include the value zero and the value (0<inclination<threshold change amount) is the condition of the establishment. Regarding to the condition (c), at the time t4, the adjustment total amount judging portion 64 judges that the total amount of the adjustment amount is equal to or less than the threshold adjustment total amount execution number of times to establish the condition (c). Regarding to the condition (d), at the time t4, the adjustment execution number of times judging portion 65 judges that the execution number of times of the target pressure adjustment (currently zero time) is less than the threshold execution number of times (one time) to establish the condition (d).

As shown in the lower drawing in FIG. 3, at the time t4, the target pressure adjustment is executed and the target pressure agrees with the actual pressure. In other words, the target pressure is adjusted to the upper value by the adjusting portion 60. At the time t5, the actual pressure becomes the value which is out of the dead zone and the control is changed from the holding control to the pressure increasing control. It is noted here that the predetermined condition (b) is explained as the case where the change amount of the target pressure does not include the value zero (0). Regarding to this condition, another condition may be set such as for example, the actual pressure may be a value further larger than the target pressure and the case where the inclination of the target pressure is a positive side (increasing side), or the actual pressure is smaller than the target pressure and the inclination of the target pressure is a negative side (decreasing side) and the inclination of the target pressure.

As shown by comparing the upper and lower graphs in FIG. 3, the adjusting portion 60 shifts the dead zone to the increasing side by the value that the target pressure is shifted to the increasing side by the target pressure adjustment and decreases the time point that the target pressure changes (inclines) from the constant value to the time point that the actual pressure becomes out of the dead zone range, compared to the case where the target pressure adjustment is not executed. It is noted here that as shown in FIG. 3, oppositely when the actual pressure is positioned at the lower pressure side, i.e., lower than the target pressure within the dead zone range during the time t3 through t4, the target pressure is shifted to the decreasing side by the target pressure adjustment and the time from t4 to time t5 becomes longer. However, in either case, the time period from the time when the target pressure changes to the time when the actual pressure changes, becomes half of the width of the dead zone to be in a stable state without deviation. In other words, the deviation of the control responsiveness due to the position of the actual pressure within the dead zone can be suppressed.

Figure 4:
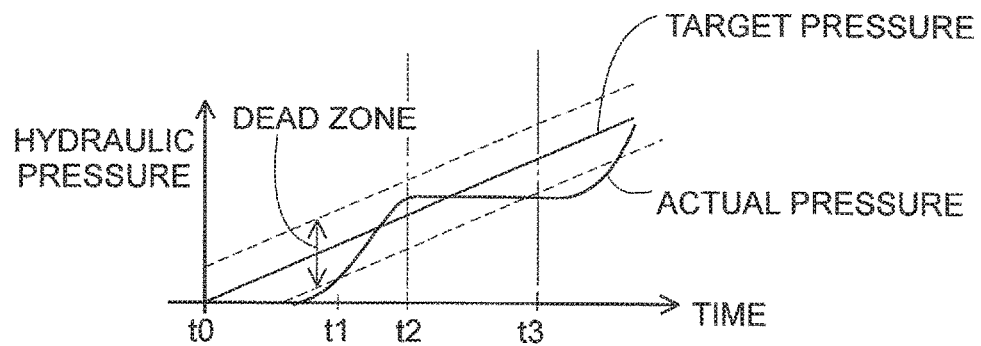
FIG. 4 is an explanatory view explaining a detail example of the target pressure adjustment according to the first embodiment.
Figure 4:
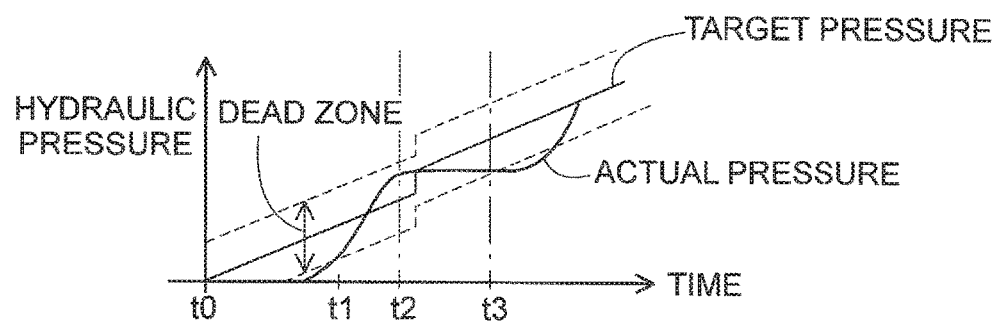

Another example will be explained with reference to FIG. 4. FIG. 4 indicates the case where the target pressure increases with an inclination equal to or less than the threshold change amount (here, the value is set to 1 MPa/s) and upper graph indicates the case of "without target pressure adjustment" and the lower graph indicates the case "with the target pressure adjustment".

According to this example, first, the actual pressure increases towards the target pressure during the time between t0 and t1. At the time t1, the actual pressure enters into the dead zone range and the control of the regulator 44 has been changed to the actual pressure holding control. The actual pressure becomes constant when the actual pressure has exceeded the target pressure by the hysteresis. At the time t2, the actual pressure becomes constant and the actual pressure change mode judging portion 62 judges that the actual pressure is constant a predetermined time after the time t2. Thus, the predetermined condition (a) is established at the predetermined time after the time t2. Regarding to the predetermined condition (b), in the time t0 through time t2, the target pressure change amount judging portion 63 judges that the change amount of the target pressure is equal to or less than the threshold change amount to establish the condition (b). Regarding to the predetermined condition (c), at the time t2, the adjustment total amount judging portion 64 judges that the total amount of the adjustment amount is equal to or less than the threshold adjustment total amount to establish the condition (c). Regarding to the predetermined condition (d), at the time t2, the adjustment execution number of times judging portion 65 judges that the execution number of times of the target pressure adjustment (currently zero time) is less than the threshold execution number of times (one time) to establish the condition (d).

The adjusting portion 60 executes the target pressure adjustment a predetermined time after the time t2. As shown in FIG. 4, in lower graph, the actual pressure agrees with the target pressure the predetermined time after the time t2. In other words, the target pressure is adjusted to the upper value by the adjusting portion 60.

The adjusting portion 60 shifts the dead zone to the increasing side by the value that the target pressure is shifted to more increasing side by the target pressure adjustment and decreases from the time t2 to the time t3, i.e., from the time point that the target pressure changes (inclines) from the constant value to the time point that the actual pressure becomes out of the dead zone range, as compared in the two upper and lower graphs in FIG. 4. It is noted here that as shown in FIG. 4, oppositely when the actual pressure is positioned at the lower pressure side, i.e., lower than the target pressure within the dead zone range at the time t2 in FIG. 4, the target pressure is shifted to the decreasing side by the target pressure adjustment and the time from t2 to time t3 becomes longer. However, in either case, the time period from the time when the target pressure changes to the time when the actual pressure changes, becomes half of the width of the dead zone to be in a stable state without deviation. In other words, the deviation of the control responsiveness due to the position of the actual pressure within the dead zone can be suppressed.

Figure 5:
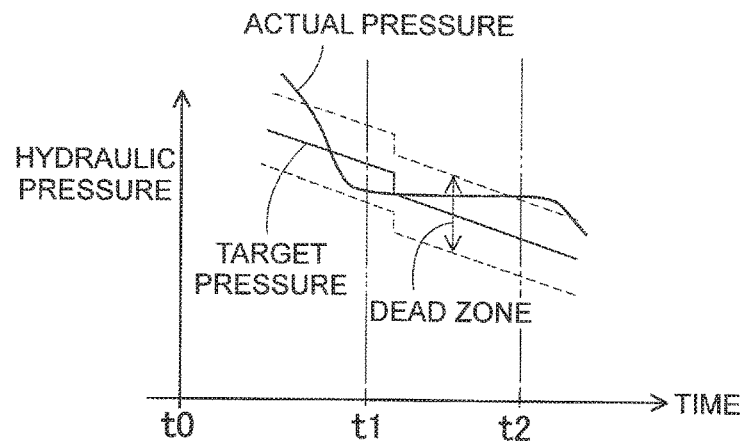
FIG. 5 is an explanatory view explaining a detail example of the target pressure adjustment according to the first embodiment.

Further, when the inclination of the target pressure is in decreasing side, as shown in FIG. 5, similar to the above examples, the delay by the dead zone can be avoided by executing the target pressure adjustment. In other words, at the time t1, after the predetermined time where the actual pressure has become constant, as similar to the example in FIG. 4, the predetermined condition has been established and the adjusting portion 60 executes the target pressure adjustment. As shown in FIG. 5, the target pressure and the actual pressure agree with each other a predetermined time after the time t1 by the target pressure adjustment. In other words, the target pressure is shifted to the lower side by the adjusting portion 60. The adjusting portion 60 shifts the dead zone to the decreasing side by the value that the target pressure is shifted to more decreasing side by the target pressure adjustment and decreases the time period for the time t1 and the time t2, i.e., from the time point that the actual pressure becomes constant to the time that the actual pressure becomes out of the dead zone range, can be decreased. As explained above, the delay may occur depending on the position of the actual pressure within the dead zone. However, the deviation of the time can be obviated. The inclination is the absolute value (magnitude of the inclination).

The adjustment execution number of times judging portion 65 resets the execution number of times when the pressure increase or decrease control to the regulator 44 starts. According to the above example, the correctable number of times during one time of the actual pressure holding control is one time (the threshold execution number of times). Thus, continuing of the pressure decreasing of the target pressure following to the actual pressure change by the adjustment can be prevented even when a pressure variation not by the hysteresis, such as a pressure leakage or the like should occur.

Further, by the determination of the adjustment total amount judging portion 64, the total amount of the adjustment amount during the one braking operation from the application of the braking force to the end thereof. Thus, in a system which requires the resetting of the adjustment amount to zero by the time the one braking operation ends (end of entire control), the target pressure adjustment can be executed in a range that the adjustment amount is reset to zero by the end of operation. The threshold adjustment total amount used at the adjustment total amount judging portion 64 can be the value variable depending on the actual pressure per predetermined time period or the braking operation amount. For example, when the actual pressure is high (or the depression amount is large) at the predetermined time point, the time until the actual pressure is decreased to be zero becomes long and the threshold adjustment total amount becomes large. However, the total amount can be made to be zero by executing more adjustment at the negative side (minus side) using such longer time. For example, when the threshold adjustment total amount (this amount may be referred to as "allowable adjustment total amount") at a certain moment is 0.3 MPa, the threshold adjustment total amount of the next moment may be 0.5 MPa. The total amount of the adjustment amount and the threshold adjustment amount are compared on a case by case basis.

The adjusting portion 60 positively execute the adjustment at the minus side in order to have the total amount to be zero, upon the inclination of the target pressure being at the decreasing side (at the time of pressure decreasing), when the total amount is a positive value (in a case where the total amount is at the increasing side of the target pressure). In other words, the adjusting portion 60 executes adjustment where the total amount decreases when the adjustment judging portion 67 judges that "the total amount is at the increasing side" and at the same time when the target pressure decrease judging portion 68 judges that "the inclination of the target pressure is at the decreasing side". For example, when the threshold adjustment total amount is 3 MPa and the total amount at present time is 2.9 MPa in the increasing side (plus side), when the inclination of the target pressure becomes at the decreasing side, regardless of the predetermined condition, the target pressure is decreased with a predetermined ratio (for example, every 0.29 MPa per one time for ten times).

On the other side, the adjusting portion 60 positively execute the adjustment at the plus side in order to have the total amount to be zero, upon the inclination of the target pressure being at the increasing side (at the time of pressure increasing), when the total amount is a negative value (in a case where the total amount is at the decreasing side of the target pressure). In other words, the adjusting portion 60 executes adjustment where the total amount decreases when the adjustment judging portion 67 judges that "the total amount is at the decreasing side" and at the same time when the target pressure decrease judging portion 68 judges that "the inclination of the target pressure is at the increasing side".

Further, according to the embodiment, the adjusting portion 60 is set to decrease the adjustment amount at the minus side even upon the pressure decreasing. This is because there may be a possibility that no pressure increasing is made from a state that the adjustment amount becomes a certain amount. In this case, the ratio of decreasing the total amount is controlled so that the ratio when the target pressure is decreasing becomes smaller than the ratio when the target pressure is increasing. In other words, when the total amount is in a minus side, upon the target pressure being decreasing, the adjusting portion 60 executes adjustment of the target pressure to the increasing side more gradually than the adjustment where the target pressure is increasing to have the total amount to be zero. According to the embodiment, the adjusting portion 60 executes the adjustment of the target pressure to the pressure increasing side even when the target pressure is decreasing. However, in this case also, the adjustment is made gradually compared to the case when the adjustment is made to the pressure increasing side upon the target pressure being increasing. This can minimize an occurrence of different feeling that the driver of the vehicle receives upon braking operation. It is noted that the adjusting portion 60 may adjust at least one of the adjustment amount per one target pressure adjustment time and the execution number of times of the target pressure so that the total amount becomes zero.

Further, according to the embodiment, since the determination of the actual pressure change mode judging portion 62 that the actual pressure is constant is the predetermined condition, the adjusting portion 60 can execute the target pressure adjustment when the actual pressure is stable. The actual pressure may be changed by the hysteresis immediately after the stopping of control to the regulator 44. However, according to this embodiment, such execution of the target pressure adjustment during the variable time period can be prevented and thus, a large variation (adjustment) of the target pressure due to the following of the target pressure to the actual pressure can be prevented.

Second Embodiment

The brake device according to the second embodiment different from the first embodiment in the function of the adjusting portion 60, wherein the adjusting portion 60 according to the second embodiment executes the target pressure adjustment when the target pressure is constant. The second embodiment is different from the brake ECU 6 of the first embodiment in that the brake ECU 6 according to the second embodiment further includes a target pressure change mode judging portion 66. The other structures are the same to those in the first embodiment and accordingly only the different portions will be explained hereinafter.

Figure 6:
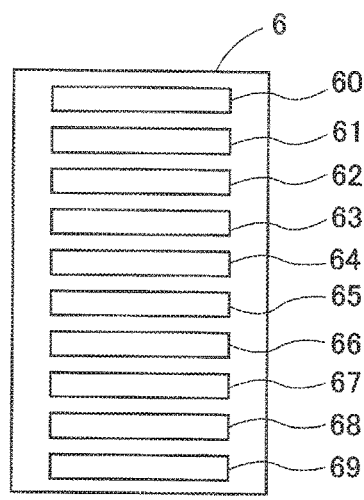
FIG. 6 is a structural view of a brake ECU according to a second embodiment.

As shown in FIG. 6, the brake ECU 6 includes, as a function thereof, the target pressure change mode judging portion 66 in addition to the components 60 through 65 and 67 through 69. The target pressure change mode judging portion 66 judges whether or not the target pressure is constant. It is noted here that the condition (b) of the second embodiment is different from the condition (b) of the first embodiment. The condition (b) of the second embodiment is that the target pressure change amount judging portion 63 has judged that the change amount of the target pressure is equal to or less than the threshold change amount (excluding the change amount that is zero) or the target pressure change mode judging portion 66 has judged that the target pressure is constant. The determination whether or not the target pressure is constant is judged by the determination whether or not the predetermined time and the change amount are zero (idle width may be set).

Figure 7:
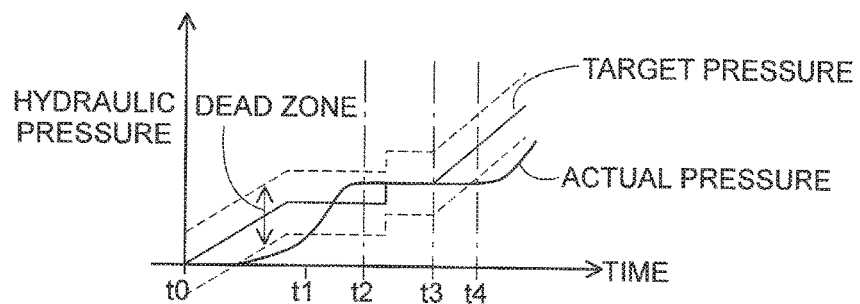
FIG. 7 is an explanatory view explaining a detail example of the target pressure adjustment according to a second embodiment.

A detail example will be explained with reference to FIG. 7. FIG. 7 shows as similar to FIG. 3, a graph that the brake pedal is depressed, then the braking force is held and then the brake pedal is depressed. The actual pressure enters into the dead zone at the time t1 and until the time t2, the tendency of the graph is similar to the tendency of FIG. 3. After a predetermined time passed after the time t2, the actual pressure change mode judging portion 62 judges that the actual pressure is constant and the target pressure change mode judging portion 66 judges that the target pressure is constant. In other words, both predetermined conditions (a) and (b) are established the predetermined time passed after the time t2. Also the conditions (c) and (d) are established as similar to those of the first embodiment. Accordingly, the adjusting portion 60 executes the target pressure adjustment after a predetermined time elapsed after the time t2. The target pressure adjustment of the second embodiment is also the adjustment for agreeing the target pressure with the actual pressure. Accordingly, the predetermined time after the time t2, the target pressure is shifted to the increasing side and thereafter, at the time t3, the target pressure changes from the constant state to the increasing inclination. However, due to the agreement of the actual pressure with the target pressure (adjustment to the central portion of the dead zone), the actual pressure can be quickly positioned outside of the dead zone. This means that the time from the time point when the target pressure changes to the time point when the actual pressure comes out from the dead zone range (the time from the time t3 to the time t4) can be shortened.

Oppositely, at the time t3, when the target pressure is changed from the constant value to the decreasing inclination, the time from the time t3 to the time t4 may be elongated due to the execution of the target pressure adjustment. However, in either case of the change of the target pressure from the constant value to the decreasing side and the increasing side, the response delay is caused by the half width of the dead zone and the deviation of the response by the dead zone can be suppressed. Accordingly, as similar to the first embodiment, the deviation of the control responsiveness by the dead zone can be suppressed by the second embodiment.

Third Embodiment

Figure 9:
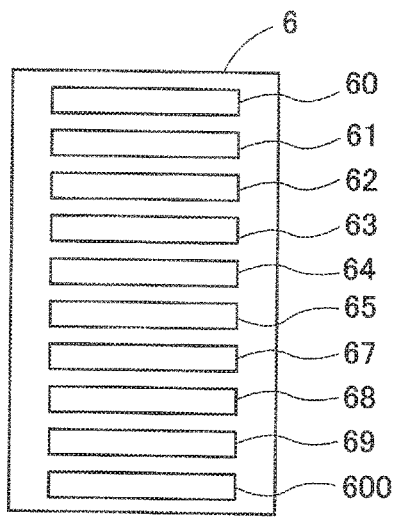
FIG. 9 is a structural view of a brake ECU according to a third embodiment.

According to the brake device of the third embodiment, the brake ECU 6 further includes a specific change judging portion 600 as shown in FIG. 9, in addition to the brake ECU 6 of the first embodiment. This embodiment is different from the other embodiments as explained above that the adjusting portion 60 executes an adjustment that decreases the total amount of adjustment amount during a predetermined execution period. Only such different structure will be explained hereinafter.

The specific change judging portion 600 detects one of the changes that the target pressure has changed from the increasing to the decreasing, that the target pressure becomes constant after increasing and then changed to decreasing, that the target pressure has changed from the decreasing to the increasing and that the target pressure becomes constant after decreasing and thereafter changed to increasing and then judges that the target pressure has been specifically changed based on the detection. In other words, the specific change judging portion 600 judges that the target pressure has made a specific change when the inclination of the target pressure is changed from plus to minus, plus to zero and to minus, minus to plus or minus to zero to plus.

The adjusting portion 60 executes the adjustment that decreases the total amount of the adjustment amount (adjustment that makes the total amount to be zero) as explained in the first embodiment when the specific change judging portion 600 judges that the change is a specific change. Thus, the execution of the adjustment that decreases the total amount is not performed as long as the change is not a specific change. This can avoid the mixture with the target pressure adjustment. In other words, the advantages derived from the target pressure adjustment which is executed other than the specific change can be accentuated. Upon the adjustment by the specific change, the timing is proper to execute adjustment that decreases the total amount and the adjustment can be effectively executed.

The adjusting portion 60 according to the third embodiment sets the execution time for adjustment that decreases the total amount and for the execution time period stops the target pressure adjustment that increases the total amount. By this target pressure adjustment, the increase of the total amount can be avoided and effectively the total amount can be decreased. The structure of the third embodiment can be combined with the structure of the second embodiment to achieve the same effects.

Other Embodiments

This invention is not limited to the embodiments as explained above and for example, the target pressure adjustment is not limited to the adjustment that the target pressure is agreed with the actual pressure. The adjustment that approximates the target pressure to the actual pressure may be within the scope of the invention that achieves the same advantageous effects as explained above. Further, one time adjustment amount can be limited to the amount less than the half width of the dead zone. However, the adjustment that makes the target pressure agree with the actual pressure can obtain the maximum effect with one time adjustment and accordingly, the control can be simplified and effective.

It is also possible that the adjustment portion 60 may set the upper limit value of the adjustment amount of the onetime target pressure adjustment to be changeable in response to the width of the dead zone. By this structure, for example, when the width of the dead zone is changed on one map, or when the width of the dead zone is different depending on the type of vehicle, the adjusting portion 60 can modify the adjustment amount to a proper amount. Further, by providing the upper limit value, an abrupt and large change of the target pressure can be suppressed.

Further, the predetermined conditions are not necessarily set. In other words, the adjusting portion 60 can execute the target pressure adjustment when the actual pressure judging portion 61 judges that the actual pressure is positioned within the dead zone. When the actual pressure enters into the dead zone range, the regulator 44 becomes the actual pressure holding control and the control is practically stopped and no large adjustment of the target pressure occurs. Accordingly, the execution of the target pressure adjustment by the adjusting portion 60 when the actual pressure enters into the dead zone can suppress the deviation of the responsiveness. Further, the invention can be applicable to the brake device which does not have the REG mode. Since the brake device with a mechanical type regulator as the regulator 44 can easily generate the hysteresis and the invention having such regulator with hysteresis is particularly effective.

It may be possible to set to execute only the target pressure adjustment that shortens the response time of the actual pressure relative to the target pressure. For example, the adjusting portion 60 may execute the target pressure adjustment when either one of the cases that the change of the target pressure per unit time is in the increasing side and the actual pressure is a hydraulic pressure higher than the target pressure or that the target pressure per unit time is decreasing side and the actual pressure is a hydraulic pressure lower than the target pressure. In this case, the deviation of response time may sometime occur but the local responsiveness can be improved.

REFERENCE SIGNS LIST

1; master cylinder, 11; main cylinder, 12; cover cylinder 13; input piston, 14; first master piston, 144; biasing member, 15; second master piston, 1A; servo chamber, 1B; first hydraulic pressure chamber, 10; second hydraulic pressure chamber, 1D; first master chamber, 1E; second master chamber, 10; brake pedal, 171; reservoir (low pressure source) 2; reaction force generating device, 22; first control valve, 3; second control valve, 4; servo pressure generating device, 41; pressure decreasing valve, 42; pressure increasing valve, 431; accumulator, 44; regulator (pressure adjusting device), 4D; first pilot chamber, 541 through 544; wheel cylinder, 5FR, 5FL, 5RR and 5RL; wheel, BF; hydraulic pressure braking force generating device, 6; brake ECU, 60; adjusting portion 61; actual pressure judging portion, 62; actual pressure change mode judging portion, 63; target pressure change amount judging portion, 64; adjustment total amount judging portion, 65; adjustment execution number of times judging portion, 66; target pressure change mode judging portion, 67; adjustment judging portion (adjustment increase judging portion, adjustment decrease judging portion), 68; target pressure decrease judging portion, 69; target pressure increase judging portion, 600; specific change judging portion, 71; stroke sensor, 72; brake stop switch, 73, 74, 75; 76; pressure sensor.

The invention claimed is:

1. A brake device for controlling an actual pressure of an output hydraulic pressure outputted from a pressure adjusting device and applying a braking force to a wheel of a vehicle based on the actual pressure of the output hydraulic pressure, wherein when the actual pressure of the output hydraulic pressure is out of range of a dead zone that is set for a target pressure of output hydraulic pressure, the pressure adjusting device is controlled so that the actual pressure of the output hydraulic pressure becomes a hydraulic pressure that is within the range of a dead zone, the brake device comprising:

an actual pressure judging portion configured to judge whether or not the actual pressure of the output hydraulic pressure is the hydraulic pressure that is within the range of the dead zone; and an adjusting portion configured to execute a target pressure adjustment for adjusting the target pressure of the output hydraulic pressure to come close to a side of the actual pressure of the output hydraulic pressure.

2. The brake device according to claim 1, further comprising: an actual pressure change mode judging portion configured to judge whether or not the actual pressure of the output hydraulic pressure is constant, wherein the adjusting portion executes the target pressure adjustment when the actual pressure of the output hydraulic pressure is judged to be within the range of the dead zone by the actual pressure judging portion and at the same time when the actual pressure of the output hydraulic pressure is judged to be constant by the actual pressure change mode judging portion.

3. The brake device according to claim 1, further comprising: a target pressure change mode judging portion configured to judge whether or not the target pressure of the output hydraulic pressure is constant, wherein the adjusting portion executes the target pressure adjustment when the actual pressure of the output hydraulic pressure is judged to be within the range of the dead zone by the actual pressure judging portion and at the same time when the target pressure of the output hydraulic pressure is judged to be constant by the target pressure change mode judging portion.

4. The brake device according to claim 1, further comprising: a target pressure change amount judging portion configured to judge whether or not a change amount per unit time of the target pressure of the output hydraulic pressure is equal to or less than a predetermined threshold change amount, wherein the adjusting portion executes the target pressure adjustment when the actual pressure of the output hydraulic pressure is judged to be within the range of the dead zone by the actual pressure judging portion and at the same time when the change amount of the target pressure of the output hydraulic pressure is judged to be equal to or less than the predetermined threshold change amount by the target pressure change amount judging portion.

5. The brake device according to claim 1, wherein, the adjusting portion configured to set an upper limit adjusting amount per one time execution of the target pressure adjustment depending on a width of the dead zone.

6. The brake device according to claim 1, further comprising:
an adjustment execution number of times judging portion configured to judge whether or not an execution number of times of the target pressure adjustment from the time when the actual pressure of the output hydraulic pressure becomes the hydraulic pressure within the range of the dead zone until a current time is less than a predetermined threshold execution number of times, wherein
the adjusting portion executes the target pressure adjustment when the actual pressure of the output hydraulic pressure is judged to be within the range of the dead zone by the actual pressure judging portion and at the same time when the execution number of times of the target pressure adjustment is judged to be less than the predetermined threshold execution number of times by the adjustment execution number of times judging portion.

7. The brake device according to claim 1, further comprising:
an adjustment total amount judging portion configured to judge whether or not a total amount of the adjustment amount of the target pressure adjustment from the time when the braking force application to the wheel starts until the current time is equal to or less than a predetermined threshold adjustment total amount that increases the target pressure of the output hydraulic pressure, or is equal to or less than the predetermined threshold adjustment total amount that decreases the target pressure of the output hydraulic pressure, wherein the adjusting portion executes the target pressure adjustment when the actual pressure of the output hydraulic pressure is judged to be within the range of the dead zone by the actual pressure judging portion and at the same time when the total amount of the adjustment amount is judged to be equal to or less than the threshold adjustment total amount by the adjustment total amount judging portion.

8. The brake device according to claim 7, wherein
the adjustment total amount judging portion is configured to change the threshold adjustment total amount in response to the actual pressure of the output hydraulic pressure or a deceleration of the vehicle.

9. The brake device according to claim 1, further comprising:
an increase adjustment judging portion configured to judge whether or not the total amount of the adjustment amount by the target pressure adjustment from the time when the braking force application to the wheel starts until the current time is the total amount that increases the target pressure of the output hydraulic pressure; and
a target pressure decrease judging portion configured to judge whether or not the target pressure of the output hydraulic pressure is decreasing, wherein
the adjusting portion adjusts the target pressure so that the total amount of the adjustment amount by the target pressure adjustment decreases when the total amount of the adjustment amount is judged to be the amount that increases the target pressure of the output hydraulic pressure by the increase adjustment judging portion and at the same time when the target pressure of the output hydraulic pressure is judged to be decreasing by the target pressure decrease judging portion.

10. The brake device according to claim 1, further comprising:
a decrease adjustment judging portion configured to judge whether or not the total amount of the adjustment amount by the target pressure adjustment from the time when the braking force application to the wheel starts until the current time is the total amount that decreases the target pressure of the output hydraulic pressure; and
a target pressure increase judging portion configured to judge whether or not the target pressure of the output hydraulic pressure is increasing, wherein
the adjusting portion adjusts the target pressure so that the total amount of the adjustment amount by the target pressure adjustment decreases when the total amount of the adjustment amount is judged to be the amount that decreases the target pressure of the output hydraulic pressure by the decrease adjustment judging portion and at the same time when the target pressure of the output hydraulic pressure is judged to be increasing by the target pressure increase judging portion.

11. The brake device according to claim 10, wherein
a target pressure decrease judging portion configured to judge whether or not the target pressure of the output hydraulic pressure is decreasing; and wherein
the adjusting portion adjusts the target pressure so that the total amount of the adjustment amount by the target pressure adjustment decreases and at the same time a decrease amount per unit time thereof becomes smaller than a case that the target pressure of the output hydraulic pressure is judged to be increasing by the target pressure increase judging portion, when the total amount of the adjustment amount is judged to be the amount that decreases the target pressure of the output hydraulic pressure by the adjustment decrease judging portion and at the same time when the target pressure of the output hydraulic pressure is judged to be decreasing by the target pressure decrease judging portion.

12. The brake device according to claim 1, wherein when the adjusting portion executes the target pressure adjustment so that the total amount of the adjustment amount by the target pressure adjustment decreases, the adjusting portion sets an execution period and prohibits the target pressure adjustment that increases the total amount of the adjustment amount in the execution period.

13. The brake device according to claim 1, further comprising:
a specific change detecting portion configured to detect as a specific change of the target pressure at least one of a change of the target pressure of the output hydraulic pressure from increasing to decreasing, a change of the target pressure of the output hydraulic pressure becoming constant after increasing and thereafter changing to decreasing, a change of the target pressure of the output hydraulic pressure from decreasing to increasing and a change of the target pressure of the output hydraulic pressure becoming constant after decreasing and thereafter changing to increasing, wherein the adjusting portion executes the target pressure adjustment so that the total amount of the adjustment amount by the target pressure adjustment decreases, when the specific change of the output hydraulic pressure is detected by the specific change detecting portion.

\* \* \* \* \*